May 26, 1936.   C. W. MICHAEL ET AL   2,042,014
FERTILIZER DISTRIBUTOR
Filed Aug. 17, 1935

Inventors
Clement W. Michael
William E. Michael
By  A. S. Krotz
    Attorney

Patented May 26, 1936

2,042,014

UNITED STATES PATENT OFFICE 2,042,014

FERTILIZER DISTRIBUTOR

Clement W. Michael and William E. Michael, Racine, Wis., assignors to The Massey Harris Company, Racine, Wis., a corporation of Maryland Application August 17, 1935, Serial No. 36,733

3 Claims. (Cl. 111—73)

Our invention relates to fertilizer distributors of the type particularly adapted to be used as an attachment for corn planters.

The object of our invention is to distribute the fertilizer whereby it is placed under the soil a distance away from and on opposite sides of the hills or rows.

A further object is to provide means whereby the furrow openers will not clog and will act to form two trenches, the depth of which is adjustable relative to the depth the seed is planted.

Another object is to provide a distributor having a suitable enamel covering inside and out and other novel means thereby to prevent clogging of dirt or fertilizer on the outside or inside of the device.

Applicants' device is particularly adapted to distribute fertilizer in concentrated form, in which state the material is inclined to clog or build up in corners or on surfaces where the material strikes at a considerable transverse angle to the direction of its movement.

We accomplish these objects in a manner which will hereinafter be described and claimed and as shown in the accompanying drawing in which:

Figures 1, 2:
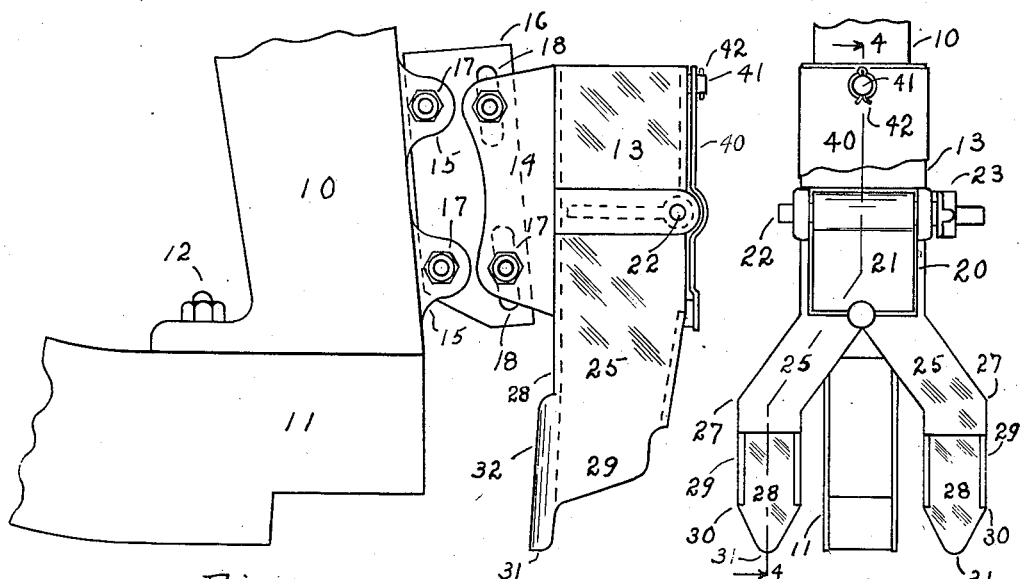
Figure 1 is a side elevation of our device, shown as attached to a conventional corn planter, a fraction only of the runner and boot being shown.
Figure 2 is a rear elevation of the device as shown in Figure 1.
Figure 3:
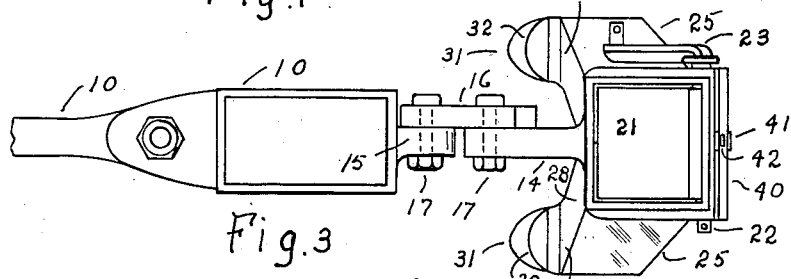
Figure 3 is a top view of the device as shown in Figure 1.
Figures 5, 6:
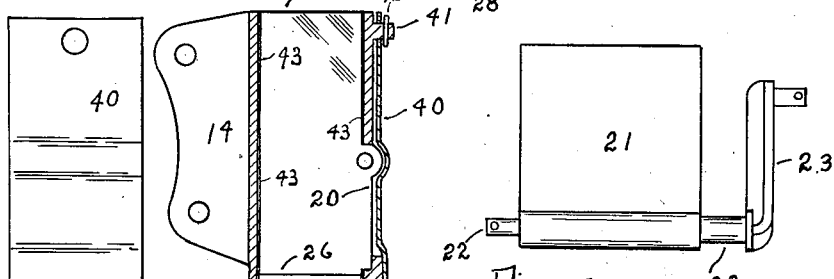
Figure 5 is a plan view of the distributing valve.
Figure 6 is a plan view of the valve shield.
Figure 4:
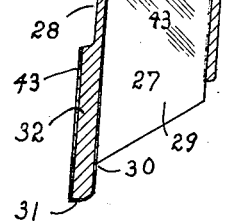
Figure 4 is a transverse vertical section of the device taken on line 4 of Figure 2.

As thus illustrated we have shown our device as attached to a well known corn planter shank 10, having a furrow opener runner 11 which is illustrated as attached to the shank by means of a bolt 12. The runner is otherwise attached at its front end (not shown) to the shank assembly or to its carrying frame.

The runner 11 is adapted to open a furrow at the desired depth and conduct the seed to the bottom of this furrow. Our device is adapted to be adjustably attached at the rear of shank 10, having means for opening two furrows one on either side of the furrow opened by runner 11.

The distributor shank or chute 13 is preferably vertically disposed a desired distance in rear of shank 10, having a forwardly extending bracket 14. The shank 10, on its rear edge, is provided with rearwardly extending lugs 15. Bracket 14 and lugs 15 are secured together by means of plate 16 and bolts 17. Plate 16 is provided with two vertically disposed slots 18—18 whereby the shank or chute may be adjusted vertically within the limits of the slots. The chute 13 is thus centrally held and may be easily adjusted to any desired vertical position.

Chute 13 is preferably square in cross section and a square opening 20 is provided as indicated. In this opening we pivotally mount a valve 21 having a shaft 22 suitably keyed thereto. This shaft is journalled in suitable lugs in the chute as indicated, whereby when the valve is open, as indicated in Figure 2, the opening 20 will be closed, and the size of valve 21 permits it to loosely close the passageway in the chute when moved to a horizontal position as shown by dotted lines in Figure 1.

Shaft 22 is provided with a crank 23, which may be connected to the valve operating means on the planter, whereby when the kernels are released at intervals, valve 21 will also be opened simultaneously thus to drop the fertilizer which has accumulated on this valve, adjacent the hill of corn or whatever is being planted.

At the bottom of chute 13 we provide downwardly and outwardly diverging outlets 25—25, an internal division point being formed as at 26. This point is in the form of an inverted V which divides and diverts the falling fertilizer in equal quantities into the two diverging outlets 25. These outlets or ducts terminate as at 27, at which point downwardly projecting furrow openers are provided, comprising a front wall 28—28 and suitably shaped side walls 29—29. These side walls 29 extend downwardly and forwardly to within a short distance of the bottom of the opener, as at 30—30. At this point the walls 28 converge and meet as at 31—31, thus to open trenches which are V shaped at the bottom.

We provide a convex front surface 32—32 on the openers which extends for the length of the openers. The portion of the device which extends into the soil is thus convexed and pointed at its end to thereby successfully form a suitable trench on opposite sides of the row.

Obviously the soil will be left slightly ridged over the seed and there will be a trench left on each side of this ridge. This is a very desirable condition for various reasons.

When the seed is drilled, as is frequently done, valve 21 is unhooked so it remains open by gravity and the opening 20 will be closed.

We provide a sheet metal shield 40 having a width and length to thereby cover the opening 20. This shield is supported and loosely held into position by means of a projecting lug 41, having a cotter pin 42, thus this shield will hang loosely and will therefore be in constant movement. Valve 21 when open also hangs loosely and will also be caused to vibrate more or less as the carrying wheels pass over the uneven soil, thus clogging or accumulation of soil or fertilizer on these and adjacent surfaces will be prevented.

The shield 40 is particularly useful when the device is attached to a conventional corn planter, since the carrying wheels are positioned close to the furrow openers, causing a constant shower of dirt to fall on or against the openers.

In order to prevent clogging or accumulation of soil or fertilizer on the surfaces, we coat the openers and chute inside and out with enamel 43, which naturally is smooth and glossy and remains so throughout the life of the device. Soil and fertilizer will not easily adhere to this surface; whereas gray iron or malleable castings are rough, subject to rust and provide a surface to which soil and fertilizer readily cling. When these parts are covered with paint it soon disappears; whereas baked enamel is hard and practically indestructible. Applicants thus provide a simple and novel surface particularly adapted for the purpose.

It will thus be observed that applicants' device is particularly suited for the purpose for which it was devised. It will, however, be understood that we have disclosed our device in its preferred form, various modifications being possible without departing from the meaning and scope of the appended claims.

Having thus shown and described our invention we claim:

1. A device of the class described, comprising a vertically disposed chute having means to be attached to the rear of a planter furrow opener, the lower end having two transversely downwardly diverging outlets terminating into two downwardly extending furrow openers, said openers positioned a distance in rear of said planter furrow opener and having a convex surface on their fronts for their length, said chute having an opening in its rear wall, a valve pivotally mounted at the top of said opening and adapted to close the same when hanging downward and to close said chute when in a horizontal position.

2. A device of the class described, comprising a vertically disposed chute having means to be attached to the rear of a planter furrow opener, the lower end having two transversely downwardly diverging outlets terminating into two downwardly extending furrow openers, said openers positioned a distance in rear of said planter furrow opener, said chute having an opening in its rear wall, a valve pivotally mounted at the top of said opening and adapted to close the same when hanging downward and to close said chute when in a horizontal position, a shield having a centrally positioned, rearwardly extending supporting pin passing therethrough and positioned above said opening and adapted to loosely support said shield therefrom, whereby to form a loose transversely swinging protecting cover for said opening.

3. A device of the class described, comprising a seed furrow opener, a vertically positioned chute attached thereto having furrow opening means at the bottom thereof and being positioned a distance in rear of said first named furrow opener, a portion of the rear wall of said chute being removed forming an opening, a valve having a hinged connection at the top of said opening and adapted to form a closure within said opening when hanging downward and to close said chute above said opening when in a horizontal position, a rearwardly projecting pin on the rear wall of said chute positioned a distance above said opening, a shield adapted to cover said opening, loosely embracing said pin and hanging freely thereon.

CLEMENT W. MICHAEL.
WILLIAM E. MICHAEL.